United States Patent [19]

Morton

[11] 4,115,805
[45] Sep. 19, 1978

[54] IMAGE ANALYSIS INDEXING APPARATUS AND METHODS

[75] Inventor: Roger R. A. Morton, Penfield, N.Y.

[73] Assignee: Bausch & Lomb Incorporated, Rochester, N.Y.

[21] Appl. No.: 580,393

[22] Filed: May 23, 1975

[51] Int. Cl.² ............................................. H04N 7/18
[52] U.S. Cl. ................................ 358/107; 235/92 PC; 364/515
[58] Field of Search ............... 178/6, 6.8, DIG. 22, 178/DIG. 36, DIG. 37; 340/146.3 AC, 146.3 AE; 235/92 PC; 358/107; 364/515

[56] References Cited

U.S. PATENT DOCUMENTS

| | | | |
|---|---|---|---|
| 2,791,695 | 5/1957 | Bareford | 235/92 PC |
| 3,390,229 | 6/1968 | Wiliams | 178/DIG. 36 |
| 3,619,494 | 11/1971 | Fisher | 178/6.8 |
| 3,624,604 | 11/1971 | Gibbard | 340/146.3 AC |
| 3,751,585 | 8/1973 | Fisher | 178/6.8 |
| 3,946,361 | 3/1976 | Cruttwell | 340/146.3 AC |

*Primary Examiner*—Howard W. Britton
*Attorney, Agent, or Firm*—Bernard D. Bogdon; Frank C. Parker

[57] ABSTRACT

Described are techniques for extracting indexing data from images scanned in a television raster format and for processing a wide variety of measurement data from images during or subsequent to the scanning operation for determining measurement parameters related to image features. Techniques are described for extracting data at specific multiple points of a feature and correlating the multiple point data from the feature during subsequent data processing. Systems and techniques are also described for storing and indexing data.

7 Claims, 5 Drawing Figures

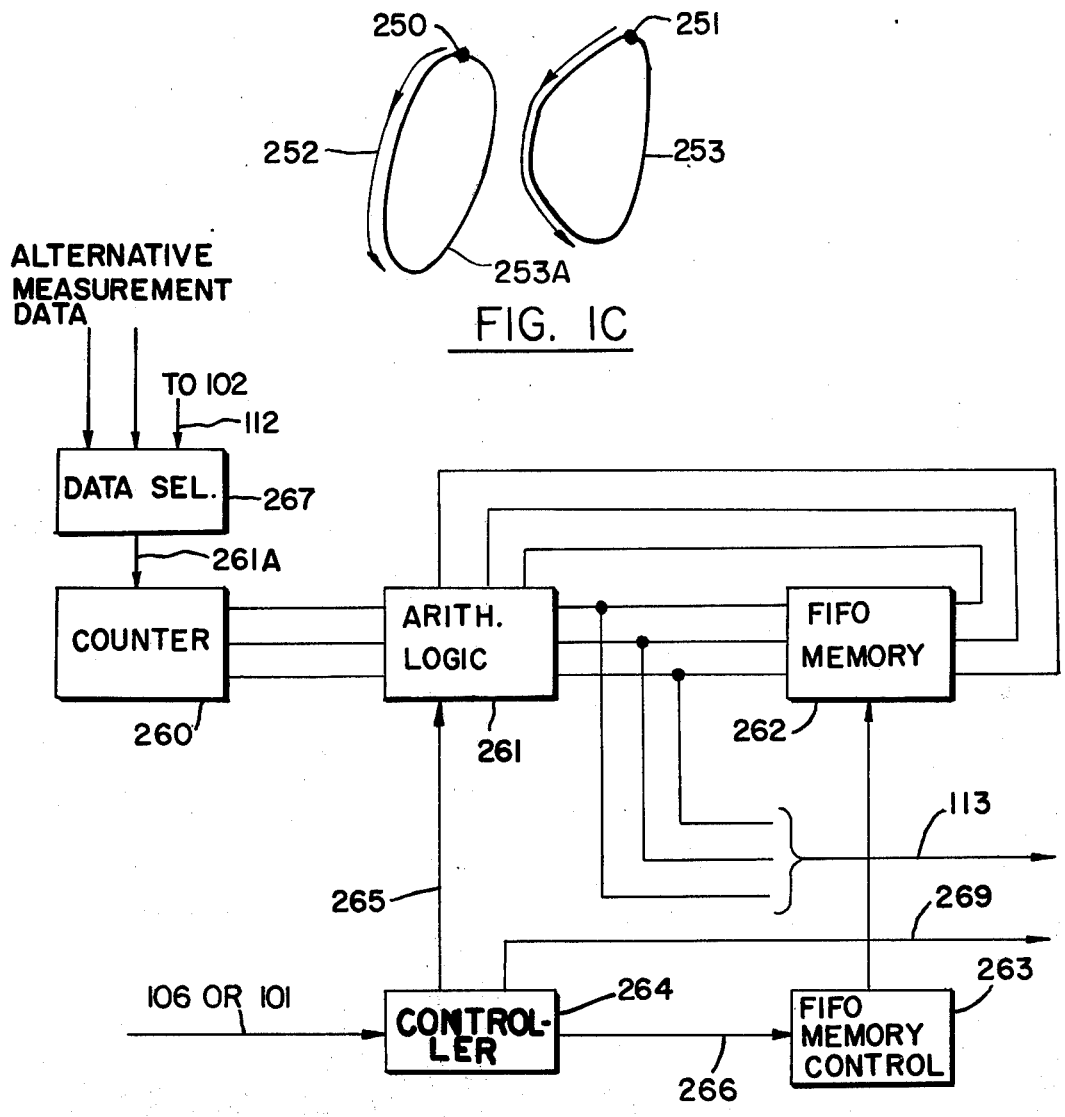
FIG. 1C
FIG. 1D
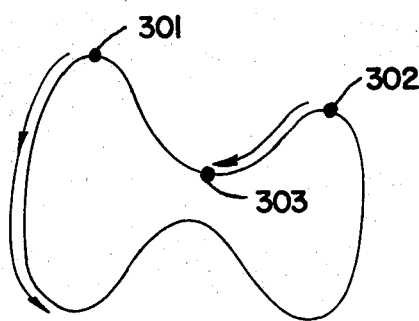
FIG. 2

IMAGE ANALYSIS INDEXING APPARATUS AND METHODS

CROSS-REFERENCE TO RELATED APPLICATIONS

This application is cross referenced to and supported by concurrently filed and copending patent applications entitled (a) Image Analysis Data Transfer, Ser. No. 580,438 for inventor R.R.A. Morton; (b) Image Analysis Data Extraction, Ser. No. 580,392 for inventors R.R.A. Morton et al; and (c) Image Analysis Measurement Apparatus and Methods, Ser. No. 580,439 for inventor R.R.A. Morton.

BACKGROUND OF THE INVENTION

1. Field of the Invention

This invention relates to image analysis apparatus and methods for extracting and processing a multiplicity of data from an image by using, in general a parallel line raster scan and more specifically it relates to image analysis systems and methods for extracting data from an image over an initial and subsequent fields of view and to correlate the extracted data to thereby enable a wide range of measurements to be performed on the feature of the image.

2. Description of the Prior Art

Techniques for extracting data from fields of scan of images or objects to be measured have generally been based on deriving the data without reference to data extracted in prior fields of view. This has tended to limit the capability and flexibility of image analysis systems becuse it was not always possible to extract from a single field of view all the information desired from the features being measured. Alternatively, it has required that information representing video signals from the entire field of scan be stored before processing of the video signals commences.

In the techniques described herein and in the concurrently filed application entitled, Image Analysis Data Transfer and also the concurrently filed application entitled, Image Analysis Data Extraction, data is extracted from an initial field of scan and it is used to control, during subsequent fields of scan, the extraction of data in those fields. This permits the accumulation of data from a particular image using repetitive scanning in such a manner that data extracted from subsequent fields of scan may be correlated between various fields of scan. This in turn provides for the extraction of more complex information and measurements from the features. The correlation is performed by means of indexing techniques, such indexing being set up on an initial field of view.

Prior techniques have not permitted the indexed extraction of data on subsequent fields of view, thereby restricting the range of both measurements and analysis which can be performed on a specific image. Prior patents, for example, U.S. Pat. No. 3,805,028, entitled Methods of and Apparatus for Determining the Quantity and Physical Parameters of Objects, issued Apr. 16, 1974 for inventor R. Morton, and U.S. Pat. No. 3,624,604 entitled Image Analysis, issued Nov. 30, 1971 to inventor D. W. Gibbard, disclose techniques for extracting data and correlating it from successive fields of view. However, neither discloses techniques for extracting and storing coordinate data in an initial field of view for later indexing with the information extracted from successive fields of view when scanning the image.

SUMMARY OF THE INVENTION

In many fields of application in image analysis, it is desired to perform complex analysis of the objects in the image being scanned. These objects which may be lakes, cells, particles, inclusions, etc. depending on the specific sample under analysis and are generally referred to as features. Analsysis of the size, shape, gray value, orientation, density of these features or the determination of their adjacency with other features requires a substantial amount of analysis and often requires extensive processing to extract the desired data.

This invention permits the processing of the data to be performed over a number of fields of scan. By the term field of scan is meant the scanning in parallel scan lines in sequential order an area referred to as a field of view. The field of scan commences at the beginning of an initial scan line and continues through subsequent sequential parallel scan lines in a raster format across the field of view concluding at the final scan line in the field. These fields of scan are performed repeatedly across the field of view during analysis.

The features or objects to be measured are imaged onto the face plate of a television camera which scans the image and produces a video signal representing the image. The scan line interceptions of the features are in general then defined and subsequent processing is generally based on these intercept signals.

Data extraction from processing occurs on a multiplicity of these fields of scan across the same field of view extracting a variety of data which may ultimately be used to contribute to the final measurements.

In the before mentioned, concurrently filed application entitled, Image Analysis Data Extraction a technique and system is disclosed which permits the storage of the video sginal produced during an initial field of scan which signal could be reproduced a multiplicity of times, thereby requiring only one actual scan of the field of view. This technique removes the requirement which would otherwise exist for the image to be stationary during analysis so that repetitive fields of scan produce the same video signal for analysis. In this application, it will be assumed that the image is stationary thereby permitting repetitive fields of scan. If the image is not stationary then a whole field storage technique similar to that disclosed in copending application entitled, Image Analysis Data Extraction, is used.

In the beforementioned copending application entitled, Image Analysis Data Transfer, a technique is described for storing on an initial field of scan of the image, information relating to X and Y coordinates of selected points of the image on the field of view. The selected points on a subsequent field of scan are used to index data derived from a measurement logic function in a manner to ensure that the data was identified with the previously indexed point. In the copending application entitled, Image Analysis Data Extraction, techniques are described for extracting data from the measurement logic in the presence of noise on the video signal or variations of the video signal between successive fields of view in such a manner that the data extracted remains indexed to the reference points acquired in an initial field of view.

An improvement on this teqchnique is to perform in conjunction with an initial field of scan or on a subsequent scan the correlation of these selected points to their respective features from which they are derived. This permits a multiplicity of points to be used for extraction of data from a single feature and for the subsequent correlation of this data from the feature using an indexing system and technique which relates data from the various points of each feature during a single field of scan back to the feature from which the points are derived.

Apparatus for performing the technique of indexing a number of points so that they are related to the feature involves elements for identifying specific topologically defined points, assigning them unique numbers, and storing and processing these unique numbers so that they may be related to a feature on a line by line basis in a manner similar to that described in copending patent application Ser. No. 298,119 entitled Method of Measuring Particulate Samples. These unique members are preferentially sequential numbers assigned during an initial field of scan. However, these unique numbers may be derived from coordinate data of topologically derived points or by other forms of unique number assignment. By identifying points of a feature at which these similar unique members may converge or by correlating these dissimilar numbers at a point beyond their convergence, indexing information is obtained which relates to the projections of features concerned.

In order to extract index information, it is necessary to follow the index number of a feature across a feature on a line to line basis. This is performed using an arithmetic logic unit and memory configured to operate from intercept information. The arithmetic logic unit should be capable of at least performing additions, comparisons, and optionally, subtraction on data accessed from memory or derived from external counters or registers. Memory elements which can be used include random access memory with write/read control logic, controlled by the occurrence of intercepts, or dual first in/first out memories with provision for one of the two sections of first in/first out to be reading while the other one is writing with an exchange between read and write taking place on alternate scan lines. Further alternative techniques and elements include dual variable shift registers or fixed rate shift registers synchronized to the scan rate. The sequence of operations to be performed by the arithmetic logic unit are determined by the topological identity of the intercepts in such a manner that the events to be executed are determined by the specific identity associated with the intercept.

It is also possible to fully buffer the arithmetic logic unit in such a way that while it is performing computational operations in the same order as the scan intercepts occur on the scan intercepts, the time at which the execution of an event associated with an intercept occurs is not directly related to the time at which the intercept occurred. Buffering the arithmetic logic unit in his manner permits measurements of features which are closely spaced while the actual time of execution for the specific feature may exceed the time to scan it.

On a measurement field of scan occurring subsequently to an initial field of scan, measurement data is generated based on video signals received by the measurement logic. This measurement data may correspond to any of a range of measurements, determined by the specific data derived from the video signal and the controlling signals passed to the arithmetic logic unit from a measurement logic controller.

Data may be transferred from the measurement logic at any time it is required by the output of a comparator which compares current X and Y coordinates with the X and Y coordinates of the index points. Alternatively, data may be transferred from the measurement logic as it is measured and those data transfers which occur simultaneously with index points are deemed to relate to the coincident index point thereby being both selected for further processing and identified by the index point.

The ability to extract a range of measurement data on different measurement fields of scan combined with the ability to subsequently correlate this data permits the generation of a broad range of measurement data to be derived from the video signal by the apparatus.

The number of points which occur per feature depends on the type of measurements being made, the topology of the feature, the density of the features in the field of view and total number of features in the field and whether points are based on intercept transition positions, the position of topologically defined points or other point position criteria. Other design considerations including memory size also affect this number. Alternatively, a mode of operation may be included in which data may be transferred without being keyed to the stored X and Y coordinates.

BRIEF DESCRIPTION OF THE DRAWINGS

FIG. 1C illustrates two features identified according to the principles of the invention described herein.

FIG. 1D illustrates the functional block of the measurement logic.

FIG. 2 illustrates a feature having two upper positive tangent points independently identified.

DETAILED DESCRIPTION OF THE PREFERRED EMBODIMENT

Figure 1A:
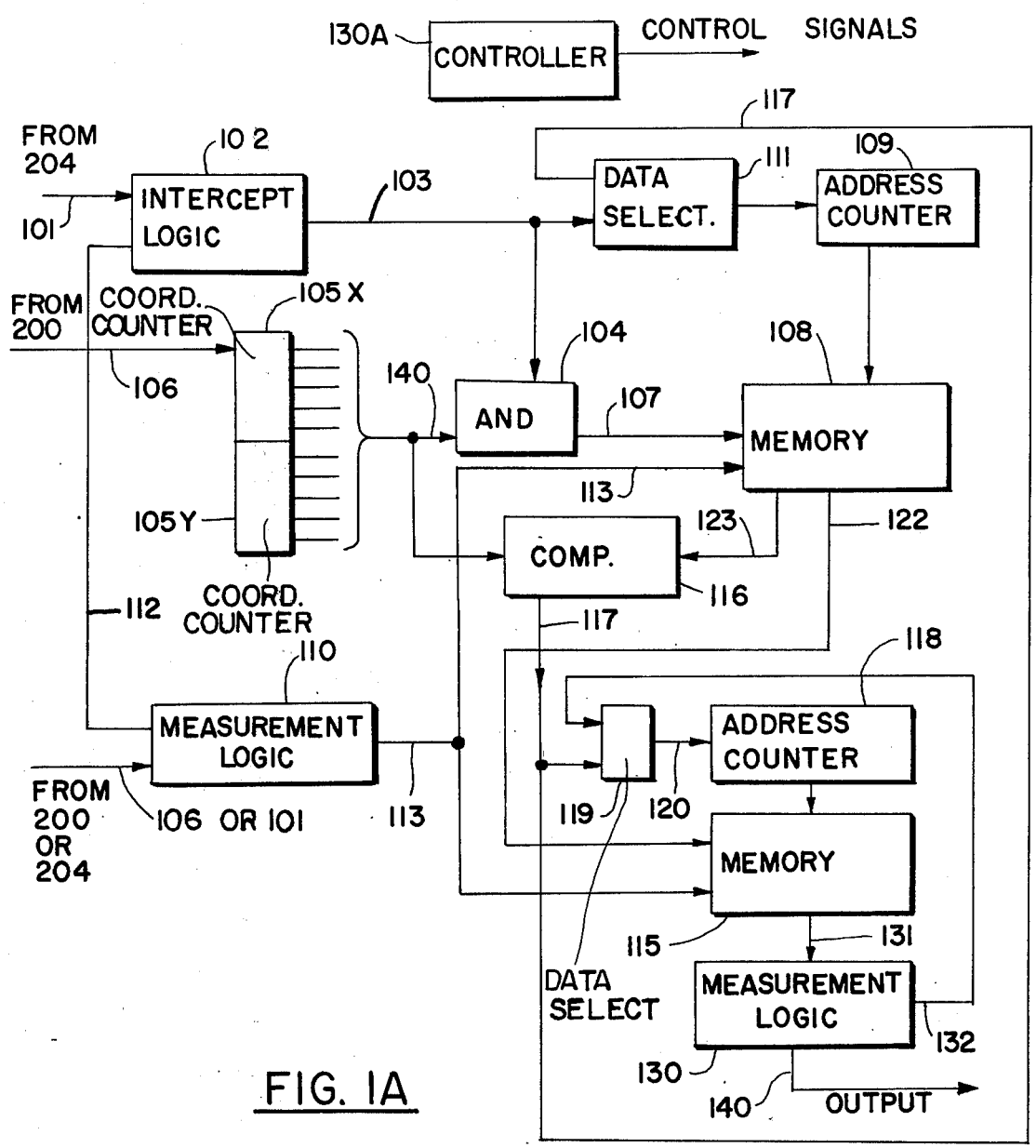
FIG. 1A illustrates a block diagram circuit of apparatus for processing the data of video signals according to the principles of the invention described herein.

FIG. 1A shows the functional block diagram of apparatus to perform the processing of video signals from successive line scans. On line 101 there appears a binary signal representing the intercepts of features within the field of view by the scan lines of the raster scan from threshold circuit 204 of FIG. 1B. This signal, termed the binary video signal or intercept signal, enters the intercept logic block 102 which corresponds to the intercept logic block 102 in FIG. 1A of the before mentioned copending patent application entitled, Image Analysis Data Transfer. As described in that application, this block generates pulses on line 103 corresponding to specific points within the field of view. These points, for example, may correspond either to transitions of the binary video signal, topologically identified points, predetermined points within the field of view or they may correspond to positions derived from other criteria including those disclosed in the copending application reference. In the last mentioned copending application, techniques and elements for deriving signals corresponding to such points are described in detail.

These pulses then pass to data selector 111 which, during an initial field of scan, directs these pulses to the address counter 109. Simultaneously, the pulses on line 103 pass to multiple AND gate 104, which causes the current X and Y coordinates on line 140 to pass into memory 108 along line 107. The data corresponding to the X and Y coordinates is generated for line 140 by coordinate counters 105X and 105Y. Coordinate counter 105X outputs continually the X coordinate of the scanning spot as it scans across the field of view by generating and counting clock pulses synchronized from scan line synchronizin pulses on line 106. Coordinate counter 105Y outputs continuously the Y coordinate of the scanning spot by counting lines of scan. These coordinate counters are controlled by synchronizing pulses appearing on the signal paths represented by line 106.

Figure 1B:
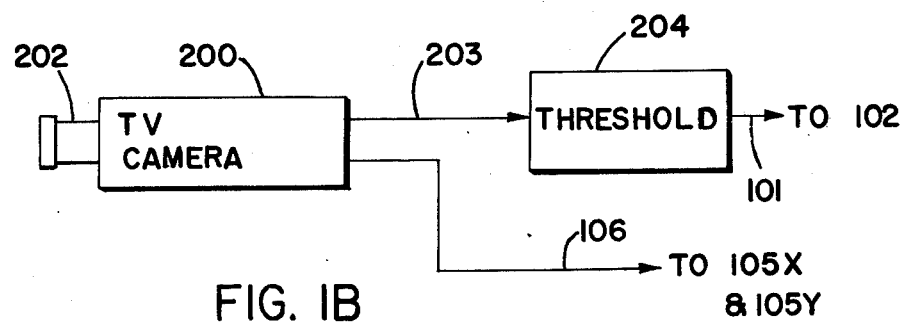
FIG. 1B illustrates a block diagram circuit for generating signals for processing by the apparatus illustrated in FIG. 1A.

The generation of the signals on lines 101 and 106 is performed in a manner similar to that described in U.S. Pat. No. 3,805,028. As shown in FIG. 1B where a television camera 200 images through lens 202 onto a field of view and produces video signals on line 203 in response to the scanning across the pickup tube of the television camera 200 by means of drive circuitry internal to the television camera. This drive circuitry outputs synchronizing pulses on line 106 corresponding to the commencement of a scan line and the commencement of a field of scan as well as vertical and horizontal blanking signals. The video signal on line 203 goes to a thresholding module 204 which takes the analog video signal on line 203 and produces a binary video signal corresponding to the interception of the scan with features or objects represented in the video signal from the image being scanned. Thresholding circuit 204 performs the process of defining the boundaries and producing the binary video signal or digital signal using one of a number of possible techniques, such as analog to digital conversion or the thresholding techniques described in U.S. Pat. No. 3,765,357 entitled Threshold Circuit for Converting a Video Signal to a Binary Video Signal, Oct. 2, 1973 for inventor Roger R. A. Morton.

The measurement logic 110 of FIG. 1A receives on line 101 or 106, the video signal and/or intercept signal, depending on the specific measurements to be performed, from, for example, threshold circuit 204 or television camera 203 in FIG. 1B, respectively. The input to the measurement logic may also correspond to an intercept signal derived from a different level of the video signal, obtained by employing a second thresold circuit. Thus, for example, the intercept signal on line 101 to intercept logic 102 of FIG. 1A may correspond to the interception of all gray and black features in the field of view, thereby producing index points related to such features. However, the intercept signal on line 101 or 106 to measurement logic 110 may correspond only to black features some of which may be within gray images and consequently measurements are only performed on black features lying within gray features or isolated from gray features. Using these techniques it is possible to select that measurements be performed first on all black features, then on all gray and black features by selecting the specific intercept signal occuring at input line 101 or 106 to measurement logic 110. The measurements may be performed using the same index points and consequently the measurements from black features may be correlated with the measurements from gray features, to thereby identify those gray features containing black features based on the ratio of measured area, for example, and permitting index point qualification based on such a criteria. Measurement logic 110 also receives alternatively, on line 112, from intercept logic 102, signals corresponding to the occurrence of topologically defined points. From these signals, it performs on an initial field of scan, the task of identifying specific intercepts to specific features or portions thereof by incrementing counter 260 of FIG. 1D, which includes the functional blocks of measurement logic 110, to produce a number identifying each specific topological point. Alternatively, the number may be produced by sampling the X and Y coordinates of the topologically defined points.

The hereinbefore mentioned copending application entitled "Image Analysis Data Transfer", Ser. No. 580,438 discloses discussion of a similar measurement logic with respect to FIG. 4A. In addition, implementation discussion of such a measurement logic is disclosed in copending patent application entitled "Image Analysis Measurement Apparatus And Methods," Ser. No. 580,439 pertinent to FIGS. 2 and 6B of that application.

If thereby outputs data identifying the number of the specific topological point for subsequent index points of the feature. This number signal appears on line 113 and is stored on the initial field of view together with the X and Y coordinate information of the index point selected by the intercept logic 102 in memory 108 through line 113.

Thus, for example on an initial field of scan, intercept logic 102 which includes, for example, the circuit of FIG. 2C, illustrated in the hereinbefore mentioned copending application entitled, Image Analysis Data Transfer, outputs on line 112 corresponding to the signal online 228 in FIG. 2C in the reference, a pulse corresponding to the upper positive tangent as shown in FIG. 1C hereof Upper positive tangents are illustrated by points 250 and 251 of FIG. 1C at which, on the upper side of a feature, a positive tangent is formed by a horizontal scan line with respect to the feature. Each of these points 250 and 251 produces a pulse on line 112 to memory logic 110. As shown in FIG. 1D, measurement logic 110 of FIG. 1A, comprises a counter 260 receiving pulses down line 261A from line 112 connected to intercept logic 102 through data selector 267.

This counter 260 assigns a number to each pulse in sequential order and the number is delivered, on the occurrence of the pulse, to the arithmetic logic unit 261, which passes the information into a dual first in/first out FI/FO memory 262. This memory stores information outputted through arithmetic logic unit 261 under control of FI/FO memory control logic 263. In order to be able to process highly convoluted and interlocking, but not touching, features or objects FI/FO memory 262 has the ability to read data at a rate and at periods which are asynchronous with respect to the scan and which are independent of the rate for instances at which the data was stored. This may be achieved using dual first in/first out memories one of which is reading or outputting during one scan line and one of which is storing during the scan line. Alternatively, a single FI/FO memory may be used, in which case provisions must be made for ensuring that data stored in different lines is clearly identified as such.

Memory control logic 263 can cause a store to occur on one or both transitions of each intercept in first in/first out memory 262, determined by control signals from controller 264 on line 266. Memory control logic 263 also causes the number of read operations occurring between line scan horizontal synchronous pulses to be the same as the number of store operations which occurred on the previous line.

Memory control logic 263 insures that read operations occur and are completed prior to the point on the scan line which has an X coordinate equal to that at the corresponding store occurred on the previous scan line. This insures that stored information is correlated sequentially to the occurrence of interception arising from the same feature. Alternatively, first in/first out memory 262 may be replaced by a random access memory in which case the memory control logic would control the addresses of locations and read/write operations to insure that the read sequence on a given scan line corresponds to the storage sequence of the data on the previous scan line. The output data from the arithmetic logic unit 261 are stored as determined by controller 264 which controls the transfers into memory 262 and the lines 113 and determines the sequence of events performed by arithmetic logic unit 261, through line 265. The specific control sequences executed by the arithmetic logic unit 261 are determined by the binary video signal intercept transitions on line 101 or 106 going to controller 264 and by the operation to be performed.

Consequently, referring to FIG. 1A, on an initial field of scan, the intercept logic 102 causes, through line 103, X and Y coordinates from counters 105X and 105Y on line 140 to be gated through AND gate 104 to memory 108, whenever a pulse arrives on line 103. Such a pulse, as already discussed, may occur on line scan intercept transitions or some other line scan intercept related event determined by the specific output signal from intercept logic 102 determined by controller 130A. Simultaneously, measurement logic 110 receives the upper positive tangent pulse through line 112, causing counter 260 of FIG. 1D to increment the data which is passed into arithmetic logic unit 261 and hence, into FI/Fo memory 262. This data is read out by arithmetic logic unit 261 on lines 113 as a result of control signals from controller 264, through line 265. On subsequent intercepts of the object the identifying number generated by counter 260 at the upper positive tangent point of the feature such as point 251, is carried through successive subsequent intercepts of the feature.

For example, the identifying number may be carried on successive intercepts along the leading edge 252 of particle 253a in FIG. 1C. This is achieved by causing arithmetic logic unit 261 to sample the identifying number from counter 260 at the point at which the counter is incremented. The arithmetic logic unit 261 passes this data to the FI/FO memory 262 where it is stored until read by the arithmetic logic unit 261 on the intercept of the feature on the subsequent scan line. Controller 264 subsequently causes the arithmetic logic unit 261 to read the FI/FO memory 262 at the leading edge of each intercept and to transfer the identifying number back into the FI/FO memory 262 at that point for storage until the succeeding intercept. The identifying number is therefore, always available to be loaded into memory 115 of FIG. 1A through line 113 whenever a pulse on line 103 occurs. Consequently, every intercept related index point appearing on line 103 is stored in memory 108, represented by its X and Y coordinates on line 107 along a number identifying the feature from which it was derived. Thus, each index point is indexed not only on its location but also on its relationship to the specific feature.

This information is used in subsequent measurement field scans for identification of measurement data from measurement logic 110 as it is transferred into memory 115. This measurement process is initiated by controller 130A. During the measurement process, memory 108 outputs the stored X and Y coordinate data. Simultaneously, the stored identification number data appears on line 122.

During this measurement process, the address counter 109 of memory 108 is incremented whenever an index pulse appears at the output of comparator 116 through line 117. The X and Y coordinate and identification data appearing at the output of memory 108 on lines 122 and 123 is read out by that memory, starting at the first stored entry in the memory list. When X and Y coordinate counters 105X and 105Y output on line 140 a current X and Y coordinate, identical to that one on line 123, comparator 116 generates an index pulse on line 117 to data selector 111 and address counter 109 is incremented causing memory 108 to read out the next location of the X and Y coordinate data on line 123. Simultaneously, the identifying number, stored in memory 108, along with the coordinate which was started during the memory storage cycle on the initial field of scan, appears on line 107.

Another event which occurs, coincident with the index pulse on line 117, is the passage of the pulse through data selector 119 and through line 120 to increment address counter 118 to cause memory 115 to store simultaneously the identification number on line 122 and the data output from measurement logic 113. Consequently, at the end of the measurement process, memory 115 contains data extracted by measurement logic 110 correlated to identification numbers identifying the feature from which the data was extracted. In further subsequent fields of scan, the measurement logic 110 may perform alternative measurements and pass those along with the identification number into memory 115.

By allowing controller 130A to preset the address counter 118 to start in a different memory location, the data can be stored into the memory 115 without disturbing data previously accumulated on other measurement fields of scan. This permits meaasurement processing logic 130, which receives data from memory 115 through line 131 and which also has control over the address counter 118 through line 132 and data selector 119, to perform computations between measurements extracted from the same point on the same feature on different measurement fields of scan. This permits correlation, comparison and computation between measurements occurring on different fields of scan to produce a final result.

As will be appreciated from the description of the preferred embodiment, the controller 130A of FIG. 1A hereof, performs a range of functions. Some of these functions include nominating the fields which will be an intial field of scan and those fileds which will be measurement fields of scan; setting the conditions of the intercept logic 102 to determine the specific type of index points required on line 103; controlling data selector 111 to select line 117 to increment address counter 109 during measurement fields of scan and to cause the pulses on line 103 to increment address counter 109 during initial fields of scan; selecting the write or read modes of memory 108 to determine the specific measurements performed by measurement logic 110; determining the time during which measurement logic processor 130 should commence to examine memory 115 to correlate measurements to specific features by examining the identification number associated with each measurement and generally supervising the sequence of operations already described.

The repetoire and order of executing specific control sequences by controller 130A determines, in conjunction with controller 264, the final measurement parameters the apparatus is to provide at output 140. Controller 130A comprises store groups of preset control sequences which place, in predetermined order, control signals on the control lines to the blocks as described. These sequences are selected and subsequently triggered to be performed by, for example, the control line 412 of FIG. 4 of copending application entitled Image Analysis Data Extraction. This control line is an output of keyboard encoder 410.

Controller 130A may be implemented using a red only memory to store the predetermined operation sequences and the desired order of sequence execution may be stored in a random access memory. Alternatively, the controller may use only nonvolatile random access memory to store both the predetermined sequences and to store the desired order of sequence execution.

In order to generate different measurement types from the measurement logic in FIG. 1D, counter 260, operating in conjunction with arithmetic logic unit 261, receives data corresponding to measurements to be extracted. Controller 264 then sequences the arithmetic logic unit 261 in conjunction with storage initiation through line 265 to perform the desired measurement. Specific examples of such measurements are discussed in copending application Ser. No. 580,439 entitled Image Analysis Measurement Apparatus and Methods. This data is received based on intercept information or video signal information through input lines entering data selector 267. This intercept information, for example, may correspond to intercept length or intercept position or other intercept characteristics and is passed into arithmetic logic unit 261 and depending on the controller 264 may be passed directly to output line 113 for storing linto memory on an intercept-by-intercept basis.

Alternatively, data may be accumulated from an arm or projection of the feature or some portion of the feature defined by intercept logic 102 and stored for a number of scan lines, prior to being passed on line 113 into memory 115 of FIG. 1A. In order to handle features which have a number of outwardly extending arms, such as the feature shown in FIG. 2, where points 301 and 302 would each receive a different count in counter 260 of FIG. 1D during the initial field of scan, the feature identification number are established in memory 108. It is necessary to be able to relate the two numbers carred by the measurement logic 110 through successive lines of the feature to identify them at a specific point.

To handle this at the junction point 303, the embodiment herein described permits two options to be performed. One option is for a single entry to be formed in the FI/FO memory 262 in FIG. 1D in which both numbers are entered. This permits all subsequent entries after the line of intersection to contain in the FI/FO memory 262 both entires and both will therefore appear as identification numbers to be fed into memories 108 and 115. This information can effectively be used later when passed into memory 115 during subsequent scans of the field of view by the measurement processing logic 130. This information can be processed to determine that all measurements obtained from the feature, whether identified with the number occurring at point 302 or the number occurring at number 301, contribute to the same feature. Alternatively, the X and Y coordinate of the point identified as point 303, may be used as one of the X and Y coincident points stored in memory 108 during the initial field of scan, and at this point, the number associated with point 301 and the number associated with 302 may be outputted, thereby equating the idenification numbers. This permits the identification, during subsequent measurement processing by measurement processing logic 130, that the results arising from these two arms belong to the same feature.

In concurrently filed and copending application entitled Image Analysis Data Extraction particularly at FIGS. 2A, 2B and 3, there is disclosed three techniques for ensuring that correct alignment occurs in the presence of noisy stationary images between data extracted on successive fields of view.

One technique and system, namely that of storing the initial field of view and reproducing it a number of times has already been discussed. An alternative technique involves alignment logic, for example, unit 265 in FIG. 2A of the last mentioned copending application. The circuit of FIG. 3 of the same copending application and the circuit of FIG. 2B, may also be applied as part of memory 115. Specifically, line 258 in FIG. 2A of that copending application corresponds to line 117 of FIG. 1A hereof and similarly, line 262 of the same copending application corresponds to line 113 of FIG. 1A of the current application.

Line 312 of FIG. 2A of the Image Analysis Data Extraction application corresponds to output line 269 from controller 264 in FIG. 1D hereof. On this line a signal appears, to identify that the data is available on line 113 for transfer to the alignment logic as part of memory 115.

At the completion of a measurement field of scan there resides in memory 115, data corresponding to measurement information correlated to index points and data identifying these index points to a specific feature.

In many cases in image analysis it is desired to determine either a compound measurement, shape factors or other derived data calculated from a number of different measurements. Measurement logic 130 generates such measurements by scanning the data stored in memory 115 at the conclusion of one or more measurement fields of scan.

For example, to determine a single measurement on a per feature basis, measurement processing logic 130 scans memory 115 to determine all entries in memory 115 identified to the specific feature through the identification number. Measurement processing logic 130 extracts the correlated measurement data and processes it to determine a single measurement. Depending on the specific measurement involved, this processing may involve summing the individual entires from each index point identified to a specific feature or determining the largest or smallest of the measurements from each index identified to the specific feature.

Compound measurements are obtained from the computation of two or more types of feature measurements. To obtain a compound measurement, measurement fields of scan are performed and individual measurement data, extracted on a per index point basis, corresponding to two or more measurements relating to each feature, is loaded into different areas of memory 115. Measurement processing logic 130 scans the different areas of memory 115 and computes the measurements for each feature and from these computes the compound measurement which is outputted on line 140.

In copending patent application entitled Image Analysis Data Extraction, means were disclosed such as described for the Reference Area and Slice Techniques, for modifying index points by selecting or qualifying the index points based either on some property of their coordinate, such as spacing, or selecting those index points whose position lay within a preferred area or identifying index points. A second manner in which index points would be qualified is based on the value of the measurement derived from these index points. These techniques may be included in FIG. 1A hereof by adding the circuit of functional blocks of FIG. 1B of the copending application cited and entitled Image Analysis Data Transfer including qualifying bit modifier 152, coordinate and spacing logic 151 and comparator 155 interconnected by lines 181 and 163.

Comparator 155 would connect through line 158 to controller 157 equivalent to controller 130A of FIG. 1A hereof. Comparator 155 of FIG. 1B of the reference copending application entitled Image Analysis Data Transfer would receive data from output 140 of FIG. 1A hereof. Similarly, data selector 164 of FIG. 1B of the some copending application reference would be inserted in line 107 hereof. These additions permit index coordinate data to be modified by qualifying the index coordinate points in the same manner as outlined in the last mentioned copending application referenced, based on X and Y coordinate data or based on the value of the output of line 140 of FIG. 1A hereof.

A further option of the preferred embodiment provides for measurement logic 110, as embodied in FIG. 1D hereof, to store in FI/FO memory 262 data placed on output line 113, for transfer at a time when it sensed that an index point did not occur simultaneously. This condition may be sensed by connecting line 117 from comparator 116 of FIG. 1A hereof, to controller 264 of FIG. 1D hereof, to enable controller 264 to sense the condition that an index point does not exist simultaneously with the data on line 113 and to store the data on lines 113 in FI/FO memory 262.

Such data may be stored for a period corresponding to a portion of line scan or for a whole number of line scans, until an index point pulse on line 117 indicates that an index point is occurring to which the data can be identified.

Throughout the specification, specific disclosure and functional operation of the controller 264 has been presented. As was hereinbefore noted, controller 264 is similar in operation to controller 264 disclosed in FIG. 6B of cross-referenced application "Image Analysis Measurement Apparatus And Methods," Ser. No. 580,439. In the present disclosure, control signals from controller 264 control the operation of memory control logic 263 and the store in memory 262. Likewise, the controller 264 controls the output data from the arithmetic logic 261 and controls the transfer into memory 262 and the sequential events performed by the arithmetic logic 261. The read out from arithmetic logic 261 is controlled by controller 264. In its operation, the controller causes the arithmetic logic unit to read the FIFO memory 262 at the leading edge of each intercept and to transfer the identifying number into the memory 262 at that point for storage until the succeeding intercept. Controllers 130A and 264 cooperatively determine the final measurement parameters to be provided at the output.

It is claimed:

1. A system for extracting data from a field of view and an image of an object in the field of view using repeated scans of the image, comprising:
   means for producing a video signal as a function of the image;
   means for producing a binary video signal as a function of the video signal of the object image in the field of view;
   means for extracting data defining a point within the field of view; and
   means for identifying the point to an object in the field of view by a comparison between the extracted point data and binary video signal image related data.

2. An image analysis system scanning an image in a field of view, comprising:
   means for storing positional data related to each point identifiable to groups of points within the field of scan;
   means for releasing as a function of a point within the field of scan data which was generated during a scan of that point within the field of view; and
   means for identifying the released data to a group identified by the point for which the data was released.

3. An image analysis system for scanning a field of view, comprising:
   means for storing data related to a point correlated to a group of such points within the field of view; and
   means for identifying data generated during a scan of the field of view at a position corresponding to the stored data related to the point correlated to the group of points.

4. An image analysis system employing line-to-line storage of data generated as a function of scanned images, comprising:
   memory means for storing the image related data during the scan line;
   memory control means controlling the release of image related data from the memory means on a subsequent scan line in such a manner that the sequence of the released data corresponds to the sequence of the stored data such that the time of data release is independent of the time of data storage.

5. An image analysis system performing compound measurements derived from two or more measurements extracted from different fields of scan on each of a number of objects within a field of scan, comprising:
   means for performing, during a first field of scan, measurements on individual objects within the field of scan;
   means for performing on a second field of scan a different measurement on the objects within the field of scan;
   storage means for storing the measurements from each of the field of scans; and
   measurement processing means for processing for each object the measurements from each of the field of scans to form a compound meaurement.

6. In an image analysis system for performing measurements on objects in the field of view for selecting qualified points conditional upon the value of the measurement, comprising:
   means for providing measurement values on objects during a field of scan by extracting data at predetermined points within and during the field of scan;

means for storing the measurement values extracted during the field of scan;

means for comparing the stored measurement values with a predetermined value to select qualified points from the predetermined points; and controlling the generation of measurement data on a subsequent scan as function of the data extracted from the qualified points.

7. In an image analysis system, a method of extracting data from a field of view and an image of an object in the field of view using repeated scans of the image, comprising the steps of:

providing a relatively stationary image in a field of view during respective fields of scan of the field of view;

generating data describing points within the field of view;

storing the data describing the points within the field of view;

identifying the points to the image of the object within the field of view;

scanning the image of the object in the field of view a multiplicity of times;

generating video data as a function of the video signal of the scanned image of the object in the field of view for each scan of the object; and identifying generated video data to an object as a function of the relationship of the points within the field of view to the image of the object.

* * * * *

UNITED STATES PATENT AND TRADEMARK OFFICE
CERTIFICATE OF CORRECTION

PATENT NO. : 4,115,805
DATED : September 19, 1978
INVENTOR(S) : Roger R.A. Morton It is certified that error appears in the above-identified patent and that said Letters Patent are hereby corrected as shown below:

Col. 6, line 17, delete "If" and substitute therefore --It--;

Col. 8, line 18, delete "started" and substitute therefore --stored--;

Col. 9, line 13, delete "red" and substitute therefore --read--;

Col. 11, line 19, delete "reference" and substitute therefore --referenced--;

line 23, delete "reference" and substitute therefore --referenced--; and line 50, delete "264" and substitute therefore --6264--.

Signed and Sealed this

Nineteenth Day of December 1978

[SEAL]

Attest:

RUTH C. MASON
Attesting Officer

DONALD W. BANNER
Commissioner of Patents and Trademarks